UNITED STATES PATENT OFFICE.

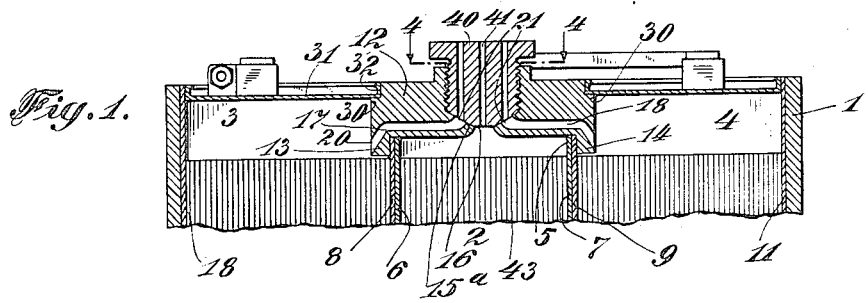
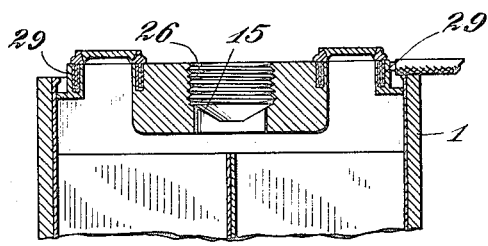
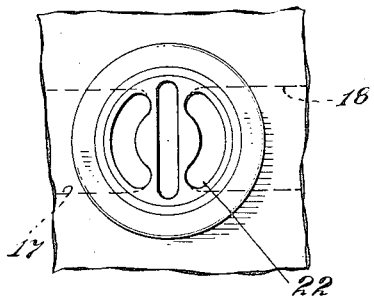
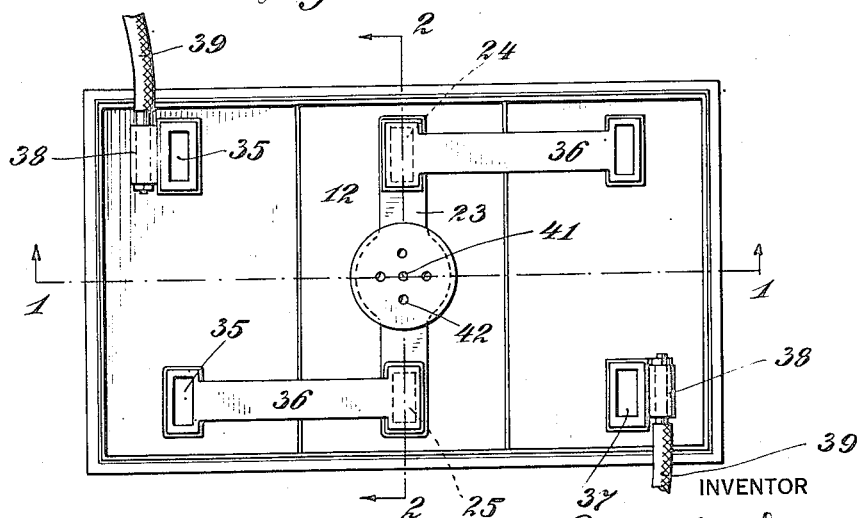

ROBERT S. BLAIR, OF SOUND BEACH, CONNECTICUT.

STORAGE-BATTERY CONSTRUCTION.

1,416,327. Specification of Letters Patent. Patented May 16, 1922.

Application filed May 9, 1919. Serial No. 295,876.

*To all whom it may concern:*

Be it known that I, ROBERT S. BLAIR, a citizen of the United States, and a resident of Sound Beach, in the county of Fairfield and State of Connecticut, have invented certain new and useful Improvements in Storage-Battery Constructions, of which the following is a specification.

This invention relates to electrical apparatus and with regard to its more specific features, to storage batteries.

One of the objects is to provide apparatus of the above type, of relatively simple construction, which may readily be maintained in proper condition for use.

Another object is to provide means which will facilitate and expedite the filling and replenishing of such batteries with electrolyte.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is shown one of various possible embodiments of the several features of this invention, Fig. 1 is a fragmentary view in vertical longitudinal section of my battery.

Fig. 2 is a sectional view taken along the line 2—2 of Fig. 1.

Fig. 3 is a top view of my battery, and

Fig. 4 is a detail top view of the filling opening, the cover being removed.

Similar reference characters refer to similar parts throughout the different views of the drawings.

Referring now to the drawings, there is shown a battery box 1, enclosing by way of example, three cells, a central cell 2 and lateral cells 3 and 4, the central cell having a container 5, whose sides 6 and 7, respectively, are preferably in contact with the sides 8 and 9 of the containers 10 and 11, of cells 3 and 4. The sides 5 and 6, 8 and 9 are preferably made shorter than the height of the battery box 1, and I prefer to provide a cover 12 for the central cell of a special construction. This cover preferably comprises a member of vulcanite, glass, or the like, of substantially the dimensions in plan of the central cell, said cover having flanges 13 and 14 preferably overlapping the sides 8 and 9 respectively, of the lateral cells. The cover member preferably has a substantially frusto-conical depression centrally in its top, as shown at 15, having a bottom 15ª and lateral surface 19, said bottom connecting directly by an opening 16 with the interior of cell 2. Extending from the inclined surface 19 of depression 12, I preferably provide a pair of symmetrically disposed ducts 17 and 18, one of said ducts extending from the lateral surface 19, through the cover member 12 to cell 3, and duct 18 extending similarly to cell 4. Each of ducts 17 and 18 preferably extends from a point 20 in the lateral cell below passage 16, to a point 21 in surface 19, above said passage 16.

The cross section of ducts 17 and 18, is preferably elongated as shown at 22, for a purpose appearing more fully below.

The top of cover 12 preferably has an integral central platform 23, through the ends of which platform extend terminals 24 and 25 of the cell plates 43, the central portion of said platform having a threaded opening 26 therein, aligned with the frusto-conical depression 15.

The cover 12 preferably has two of its sides sealed in place within the cell container by sealing compound of any desired composition, extending between the side of said cover and the inner face of the container. The terminals 24 and 25 are also preferably sealed in place within annular depressions 29 in the cover, as appears clearly from Fig. 2.

A shoulder 30 is preferably provided at each side of the cover 12, and a cover 31 having preferably an upstanding flange 32 is provided for cell 3, said cover being sealed in place by sealing compound, and one side of said cover resting upon shoulder 30, and being sealed thereto.

The cover 31 has terminals 35 of any desired construction, said terminals being by preference similar to those on cover 12, but said cover is not provided with a filling opening. A similar cover with similar terminals to those just described, and also devoid of a filling opening, is provided for lateral cell 4. The intermediate cell terminals are joined by the usual connectors 36, and the extreme cell terminals 35—37 constitute the terminals of the battery, these terminals being preferably provided with integral sockets 38, within which the cables 39 are secured by any desired means not constituting a part of my invention.

Threaded within opening 26, I provide a plug 40, having a frusto-conical end adapted to exactly fill the depression 15 in the central cover. The plug is preferably provided with an axial vent opening 41, and with a plurality of longitudinal vent openings 42, some of which are adapted to register with ducts 17 and 18.

When my battery is prepared for use, it is merely necessary to remove the single plug 40, and to pour the electrolyte into the opening. The liquid will then flow simultaneously into all of the cells, the central opening 16 providing a passage for the central cell, and the ducts 17 and 18 providing passages respectively for the cells 3 and 4. In view of the elongated cross section of ducts 17 and 18, the liquid can readily pass through the duct, ample allowance being thus made for the escape of air, as the electrolyte enters the lateral cells. When the cells are full, the liquid can be seen near the top of opening 16 and near the lower edges of the visible ends of ducts 17 and 18. The cells being thus full, the vent plug 40 is screwed in place, closing the filling opening and simultaneously closing each of the ducts as well as opening 16. The plug thereby prevents interchange of electrolyte between the cells. When the battery needs water, it is merely necessary to remove plug 40 and insert the water through single filling opening, the three cells being thus replenished in a manner similar to the original filling operation above described.

In the actual use of the battery, the central vent opening 41, allows escape of gas from the central cell and one of the vent openings 42 at least will communicate with each of the ducts 17 and 18, thus allowing for escape of gas from each of these cells.

Although by way of illustration, I have shown my duct construction as an integral part of the central cover, it is to be understood that the function of these ducts may be performed by a separate member. It is also to be understood that although by way of example, I have shown my invention as applied to a battery of three cells, it is to be understood that this invention is applicable to a greater or lesser number of cells. As to these features, however, I prefer to employ the specific construction shown and described.

It will thus be seen that there is herein described apparatus in which the several features of this invention are embodied, and which apparatus in its action attains the various objects of the invention, and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In combination, a storage battery comprising a plurality of cells in a liquid-tight casing enclosing the same, and a single filling opening for filling a plurality of said cells communicating directly with each of said cells.

2. In combination, a storage battery comprising a plurality of cells in a liquid-tight casing enclosing the same, a single filling opening through said casing for admitting liquid to all said cells and means adapted to close said opening.

3. In combination, a storage battery, comprising a plurality of cells, a single filling opening therefor, ducts leading from said opening one to each cell, and means for closing said ducts and thereby preventing communication between said cells.

4. In combination, a storage battery, comprising a plurality of enclosed cells, a single filling opening therefor, ducts leading from said opening one to each cell, and a unitary member for closing all said ducts.

5. In combination, a storage battery, comprising three cells, each provided with a cover, the cover of the central cell having a filling opening communicating with all three cells, and a plug for sealing said opening and preventing communication of electrolyte between said cells.

6. In combination, a storage battery, comprising three cells, the central cell having a cover with a filling opening therein, said opening communicating with ducts, one leading to each said cell, and a vent plug for sealing said opening, and preventing communication of electrolyte between said cells.

7. In combination, a storage battery, comprising three cells, the central cell having a cover, whose sides overlap the walls of the lateral cells adjoining said central cell, a filling opening in said cover, ducts leading from said opening, one to said central cell, and one to each of said lateral cells, the latter ducts extending from a level below the lowermost point of said central duct, to a level above the uppermost point of said central duct, and a single plug for sealing said opening and said three ducts.

8. In combination, a storage battery comprising three adjoining cells, each cell having walls, the end walls of the central cell and the walls adjacent thereto of the lateral cells being lower than the remaining walls, a cover for said central cell, extending over said shorter walls, covers on said other cells, each having an edge resting on said first cover, a filling opening in said central cover, having ducts communicating with each said cell, and a single plug sealing said opening and said ducts.

Signed at New York city in the county of New York and State of New York this 8th day of May, A. D. 1919.

ROBERT S. BLAIR.